US006184893B1

(12) United States Patent
Devic et al.

(10) Patent No.: US 6,184,893 B1
(45) Date of Patent: Feb. 6, 2001

(54) METHOD AND SYSTEM FOR FILTERING TEXTURE MAP DATA FOR IMPROVED IMAGE QUALITY IN A GRAPHICS COMPUTER SYSTEM

(75) Inventors: Goran Devic, Austin; Christopher W. Shaw, Pflugerville, both of TX (US)

(73) Assignee: Cirrus Logic, Inc., Austin, TX (US)

( * ) Notice: Under 35 U.S.C. 154(b), the term of this patent shall be extended for 0 days.

(21) Appl. No.: 09/004,483

(22) Filed: Jan. 8, 1998

(51) Int. Cl.$^7$ .................................................. G06T 11/40
(52) U.S. Cl. ........................... 345/430; 345/428; 345/475
(58) Field of Search ..................................... 345/428, 430, 345/475

(56) References Cited

U.S. PATENT DOCUMENTS 5,886,706 * 3/1999 Alcorn et al. ....................... 345/430

OTHER PUBLICATIONS

Greene et al., "Creating Raster Ominax Images from Multiple Perspective views using The Elliptical Weighted Average Filter".*

* cited by examiner

*Primary Examiner*—Mark Zimmerman
*Assistant Examiner*—Lance W. Sealey
(74) *Attorney, Agent, or Firm*—Anthony C. Murabito; Steven Lin; J. P. Violette

(57) ABSTRACT

A method and system for filtering texture map data for improved image quality in a graphics computer system. The present invention is directed to a method and system for performing texture map filtering for reducing "flickering" and "sparkling" when rendering a relatively small graphics primitives using a texel map of relatively larger area and low color frequency. A footprint area is defined as the area of texel map space that is mapped into one pixel coordinate of display space. One embodiment of the present invention is particularly useful in texture mapping where the footprint area is larger than one. In this instance, during rendering, the change in texel map coordinates (e.g., du, dv) is large for a unit change in screen coordinates (e.g., dx, dy). When obtaining a texel at location (u, v), the present invention performs a color filtering of texels located at distances du and dv away from the texel at location (u, v). If texel wrap is not allowed, edge pinning is used to obtain the required texels for color filtering. The texels which are rendered in adjacent pixels on the display screen become more colored filtered with respect to each other rather than filtering nearest neighbor texels which often leads to flickering and sparkling in texture mapping cases of large footprint areas. The present invention reduces flickering and sparkling without requiring multiple texture maps (and therefore additional memory), as required using mipmapping.

21 Claims, 14 Drawing Sheets

METHOD AND SYSTEM FOR FILTERING TEXTURE MAP DATA FOR IMPROVED IMAGE QUALITY IN A GRAPHICS COMPUTER SYSTEM

FIELD OF THE INVENTION

The present invention relates to the field of computer controlled graphics display systems. More specifically, the present invention relates to computer controlled graphics display systems utilizing texture mapping.

BACKGROUND OF THE INVENTION

Computer controlled graphics systems are used for displaying graphics objects on a display. These graphics objects are composed of graphics primitive elements ("graphics primitives") that include points, lines, polygons, etc. The graphics primitives can be used to render a 2 dimensional (2D) image of a three dimensional (3D) object on a display screen. In the process of rendering 3D graphics, many techniques are used to create realistic 3D effects. Some of these techniques involve Gouruad shading, texture mapping, bilinear filtering, specular lighting and fogging effects. Texture mapping refers to techniques for adding surface detail to areas or surfaces of these 3D graphics objects displayed on a 2D display. Often texture map information is added to displayed polygons.

Generally, texture mapping occurs by accessing encoded surface detail points or "texels" from a texel map memory space ("texel map") which stores the surface detail and transferring the surface detail texels to predetermined points of the graphics primitive to be texture mapped. The process of determining the texels that correspond to pixels is called sampling the texture map. The texture image within a texture map is represented in computer memory as a bitmap or other raster-based encoded format. Texels reside in a (u, v) texture coordinate space. However, the display screen includes point elements (pixels) which reside in an (x, y) display coordinate space. Therefore, texture mapping applies color or visual attributes of texels of the (u, v) texture map to corresponding pixels of the graphics object (primitive) on the display screen. Color values for pixels in (x, y) display coordinate space are determined based on sampled texture map values.

After texture mapping, a version of the texture image is visible on surfaces of the graphics primitive. Because the original graphics object is 3D, texture mapping often involves maintaining certain perspective attributes with respect to the surface detail added to the object. Therefore, the manner in which a texture map is sampled, e.g., by du and dv values, is different depending on the perspective and size of the polygon.

FIG. 1A illustrates a rendering situation in which a relatively large area texel map memory space 10 is used to provide surface detail to a relatively small area polygon 20 of a display screen. In this example, the texel map 10 is in a raster format and contains 512 texels by 512 texels while polygon 20 may contain as few as 10 pixels total. During rendering, because the polygon 20 is relatively small, the texels of the texel map 10 are sampled over large distances to provide the color for the pixels of the displayed polygon 20. This rendering situation typically causes "flickering," also called "sparkling," within the polygon which is shown as lines 25. Sparkling is caused because the rendering process samples different sets of texels from the texel map 10 for successive update frames of the display screen as the polygon 20 may slightly change its perspective between frames. Because the texels are sampled at large distances from each other, any small change in the sample process can cause very differently colored texels to be obtained from frame to frame; this is especially true for texel maps having high color frequency. Displaying the different texel sets causes an animated effect of sparkling within the polygon 20. It is desirable to reduce sparkling within graphics systems to provide more realistic 3D effects. As described further below, mipmapping has been used to reduce sparkling.

FIG. 1B illustrates a rendering situation in which a relatively small area texel map memory space 30 is used to provide surface detail to a larger area polygon 40 of a display screen. In this example, the texel map 30 is in a raster format and contains 10 texels by 10 texels while polygon 40 may have 10 times the area of the texel map 30. Although this situation does not lead to sparkling, as described above, it does lead to "blocky" image quality within polygon 40 reducing its realism. During rendering, because the polygon 40 is so much larger than the texel map 30, the texels of the texel map 30 are subsampled and the result is blocky surface detail 42 displayed within the large polygon 40. As described further below, bilinear filtering has been used to reduce the blocky image quality described above.

In the prior art, the technique of mipmapping has been used to address the problem of sparkling when rendering a polygon in the rendering situation of FIG. 1A. An example of mipmapping is shown in FIG. 2. In effect, mipmapping requires that several different texel maps (called "mipmaps") 51–54 be associated for each texel map 50. The mipmap used depends on the size of the polygon to be rendered. The #0 or original mipmap 50 is the original texel map. Each successive mipmap is then ¼ the size of its predecessor mipmap. Therefore, #1 mipmap 51 is ¼ the area of mipmap 50; #2 mipmap 52 is ¼ the area of mipmap 51; #3 mipmap 53 is ¼ the area of mipmap 52; and #4 mipmap 54 is ¼ the area of mipmap 53. As such, mipmap 52 is 1/16 the size of original mipmap 50, mipmap 53 is 1/64 the size of original mipmap 50, and mipmap 54 is 1/256 the size of original mipmap 50. In mipmapping, depending on the relative size of the polygon to be rendered, a different mipmap of 50–54 is selected to perform texel mapping for the polygon. By using a smaller sized mipmap for a small polygon, the distance over which texels are sampled during rendering is reduced thereby reducing sparkling.

Although effective for reducing sparkling in the rendering situation of FIG. 1A, mipmapping has disadvantages. Each mipmap of 50–54 needs to be separately generated by a designer and this generation process is typically manual and/or involves complex and time consuming generation procedures. The mipmaps have to be generated for each original texel map. Further, because multiple mipmaps are required for each original texel map, additional computer memory is consumed (e.g., 33% more memory is required for each texel map) when implementing mipmapping techniques. Therefore, mipmapping restricts the number of unique texel maps that can reside within a graphics computer system. It would be advantageous to provide a technique for reducing or eliminating sparkling without the increased memory consumed by mipmapping techniques.

Bilinear filtering has been used in the past to reduce the blocky appearances of surface detail as described with reference to the rendering situation of FIG. 1B. Bilinear filtering is used as a step in the process of applying texture to polygons. As described below, bilinear filtering involves an average of the nearest neighbor texels of the sampled texels before rendering the polygon. By performing color averaging, the sharp boundaries with blocky appearances, as shown in FIG. 1B, are reduced or eliminated. Bilinear filtering has not been applied to reduce sparkling in the rendering situation of FIG. 1A.

FIG. 3 illustrates bilinear filtering with an exemplary texel map 60 having a red color portion 60a, a green color portion 60b and a blue color portion 60c. Within texel map 60, three texels are sampled, texel 61, texel 64 and texel 66, to be used in the rendering of respective pixels 73a, 73b and 73c of displayed polygon 71. In bilinear filtering, the color of texel 61 and its nearest neighbors (e.g., adjacent texels) 62a–62d are averaged together to obtain the texel color for respective pixel 73a. Next, the color of texel 66 and its nearest neighbors 65a–65d are averaged to obtain the texel color for respective pixel 73b and the color of texel 66 and its nearest neighbors 67a–67d are averaged to obtain the texel color for respective pixel 73c. In the instance of FIG. 1B where the texel map is subsampled, bilinear filtering is effective at reducing sharp boundaries and blocky appearances.

However, with respect to the rendering situation of FIG. 1A where a large texel map is used for a small polygon, bilinear filtering still causes sparkling because, as shown in FIG. 3, large distances are covered in the texel samples and averaging is performed only with respect to nearest neighbors of the sampled texels. For instance, the red texel 61 is averaged with just reds, the blue texel 66 is averaged with just blue texels and the green texel 64 is averaged with just green texels. Therefore, using bilinear filtering, the high color frequency, that is imposed by the small polygon, is not effectively removed from the polygon and bilinear filtering still leads to a rather high probability of having different texel sets from frame to frame when a low color frequency texel map is used in the rendering situation of FIG. 1A. Therefore, bilinear filtering has not proven to be effective at eliminating sparking effects with respect to the rendering situation of FIG. 1A.

SUMMARY OF THE INVENTION

Accordingly, the present invention provides a graphics system and method for reducing sparkling when a large texture map is used to provide surface detail to a relatively small polygon of a display screen. Further, the present invention provides a system and method for performing texel mapping that eliminates sparkling but does not require the additional memory consumed by mipmapping. These and other advantages of the present invention not described above will become clear in view of the following detailed description of the present invention.

The present invention includes a method and system for filtering texture map data for improved image quality in a graphics computer system. The present invention is directed to a method and system for performing texture map filtering for reducing "flickering" and "sparkling" when rendering a relatively small graphics primitives using a texel map of relatively larger area. A footprint area is defined as the area of texel map space that is mapped into one pixel coordinate of display space. One embodiment of the present invention is particularly useful in texture mapping where the footprint area is larger than one. In this instance, during rendering, the change in texel map coordinates (e.g., du, dv) is large for a unit change in screen coordinates (e.g., dx, dy). When obtaining a texel at location (u, v), the present invention performs a color filtering (averaging) of texels located at sample distances du and dv away from the texel at location (u, v). If texel wrap is not allowed, edge pinning is used to obtain the required texels for color filtering. By performing color filtering of these texels, the texels which are rendered in adjacent pixels on the display screen become more colored filtered with respect to each other rather than filtering nearest neighbor texels which often leads to flickering and sparkling in texture mapping cases having large footprint areas. The present invention reduces flickering and sparkling without requiring multiple texture maps (and therefore additional memory), as required using mipmapping.

Specifically, in a computer controlled graphics display system, an embodiment includes a method of performing texture mapping for a graphics primitive comprising the steps of: a) determining a set of pixels within the graphics primitive; b) texture mapping each respective pixel of the set of pixels based on a texture map, the step b) comprising the steps of: b1) receiving a first sample distance, du, along a first texel dimension, u; b2) receiving a second sample distance, dv, along a second texel dimension, v; b3) receiving a coordinate (u, v) of a sample texel corresponding to a respective pixel; b4) determining colors of a set of texels within the texel map located at the sample distances away from the coordinate of the sample texel; and b5) color averaging the colors determined at step b4) with a color of the sample texel to obtain a texel component for the respective pixel; and c) displaying the set of pixels with respective texel components.

Embodiments also include the above and wherein the step b4) determines colors for texels located at (u, v+dv), (u, v−dv), (u+du, v) and (u−du, v) coordinates. Embodiments include the above and wherein the step b4) determines colors for texels at (u, v+dv), (u, v−dv), (u+du, v), (u−du, v), (u+du, v+dv), (u+du, v−dv), (u−du, v+dv) and (u−du, v−dv) coordinates.

DESCRIPTION OF THE PREFERRED EMBODIMENTS

In the following detailed description of the present invention, a texture map filtering process for reducing sparkling when using a large texture map providing texture to a relatively small polygon, numerous specific details are set forth in order to provide a thorough understanding of the present invention. However, it will be obvious to one skilled in the art that the present invention may be practiced without these specific details or by using alternate elements or methods. In other instances well known methods, procedures, components, and circuits have not been described in detail as not to unnecessarily obscure aspects of the present invention.

Notation and Nomenclature

Some portions of the detailed descriptions which follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "processing" or "computing" or "calculating" or "determining" or "displaying" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission or display devices.

Computer System Platform

Figure 4:
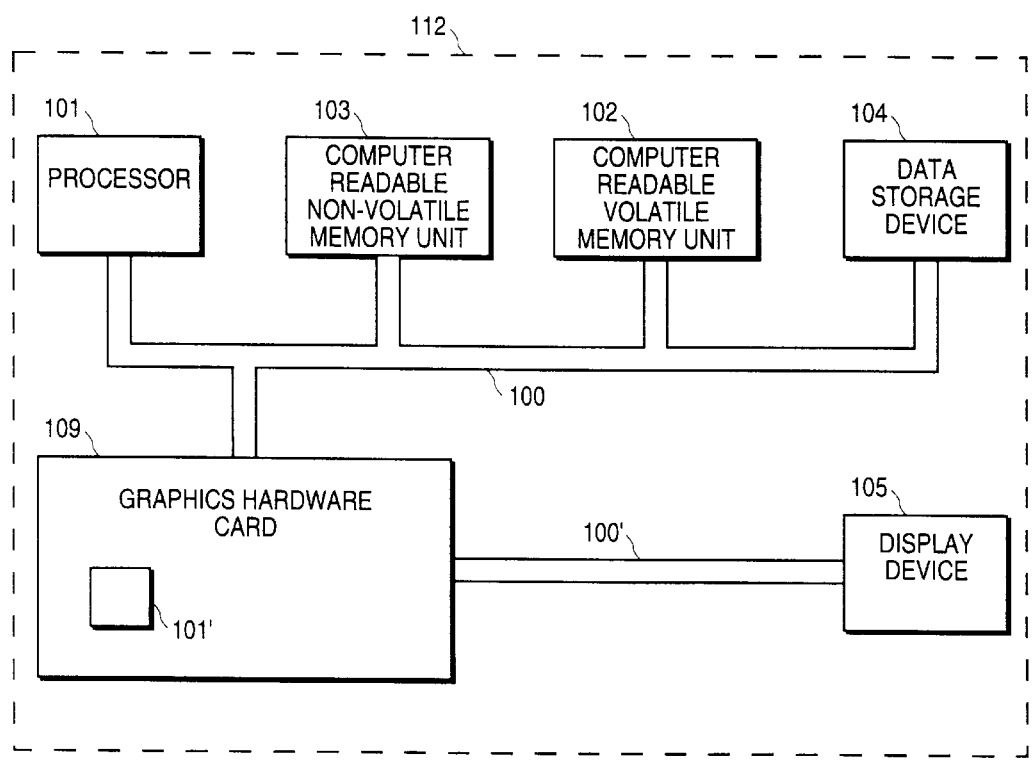
FIG. 4 is an exemplary computer controlled graphics display system used in accordance with texture filtering embodiments of the present invention.

Refer to FIG. 4 which illustrates a computer controlled graphics system 112. Within the following discussions of the present invention, certain processes (e.g., processes 400 and 500) and steps are discussed that are implemented on system 112. Certain steps can be implemented on specialized circuitry and/or by instructions that reside within computer readable memory units of system 112 and executed by processors of system 112. When executed, the instructions cause the computer system 112 to perform specific actions and exhibit specific behavior which is described in detail to follow.

In general, computer controlled graphics system 112 used by the present invention includes an address/data bus 100 for communicating information, one or more central processors 101 coupled with the bus 100 for processing information and instructions and a computer readable volatile memory unit 102 (e.g., random access memory, static RAM, dynamic, RAM, etc.) coupled with the bus 100 for storing information and instructions for the central processor(s) 101. Computer controlled graphics system 112 also includes a computer readable non-volatile memory unit (e.g., read only memory, programmable ROM, flash memory, EPROM, EEPROM, etc.) 103 coupled with the bus 100 for storing static information and instructions for the processor(s) 101.

Computer controlled graphics system 112 of FIG. 4 also includes a mass storage computer readable data storage device 104 (hard drive or floppy) such as a magnetic or optical disk and disk drive coupled with the bus 100 for storing information and instructions. Optionally, system 112 can include a display device 105 for displaying information to the computer user, an optional alphanumeric input device 106 including alphanumeric and function keys coupled to the bus 100 for communicating information and command selections to the central processor(s) 101, an optional cursor control device 107 coupled to the bus 100 for communicating user input information and command selections to the central processor(s) 101, and an optional signal generating device 108 coupled to the bus 100 for communicating command selections to the processor(s) 101. In one exemplary implementation, system 112 is an x86 microprocessor based computer system, but could equally be of a number of other various well known and commercially available platforms.

Computer controlled graphics system 112 provides data and control signals via bus 100 to a graphics hardware unit ("card") 109. The graphics hardware card 109 typically contains a display processor 101' which executes a series of display instructions found within a display list. The display processor 101' supplies data and-control signals to a frame buffer (not shown) which refreshes the display device 105 for rendering images (including graphics images). Card 109 contains one or more specialized circuits for performing graphics rendering processes in high speed for producing real-time realistic 3D images on display 105.

Texture Averaging Method and System

Figure 5A:
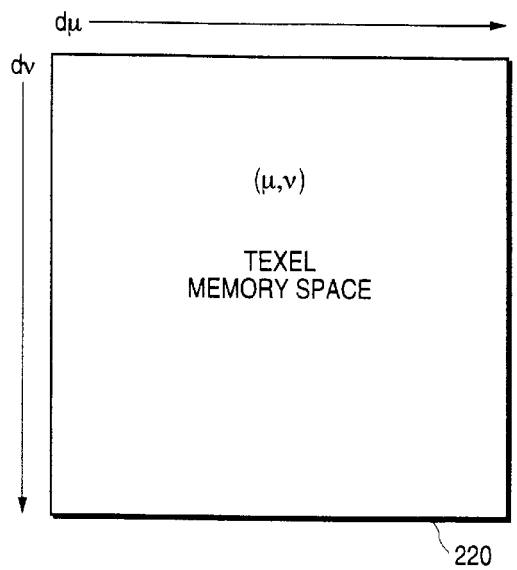
FIG. 5A and FIG. 5B illustrate texture space coordinates of a texture map and screen display coordinates of a display screen as used in accordance with the present invention.

In accordance with the present invention, two coordinate systems are discussed. These coordinate systems are described with reference to FIG. 5A and FIG. 5B. The first coordinate system involves texel coordinates of a texel memory space 220 and these texel coordinates are discussed in terms of (u, v) as is well known in the art. Texel maps exist within texel space 220. Individual texels are mapped into a texel map according to (u, v) coordinates. When sampling a particular texel at a coordinate (u, v) of a texel map, the distance in texel coordinates to the next sampled texel is expressed as (du, dv). As described further below, the values of u, v, du, and dv for a particular graphics primitive are either provided by parameterization processes or by rendering processes and circuits. Processes and circuitry used for the computation of these values for a graphics primitive are well known.

Figure 5B:
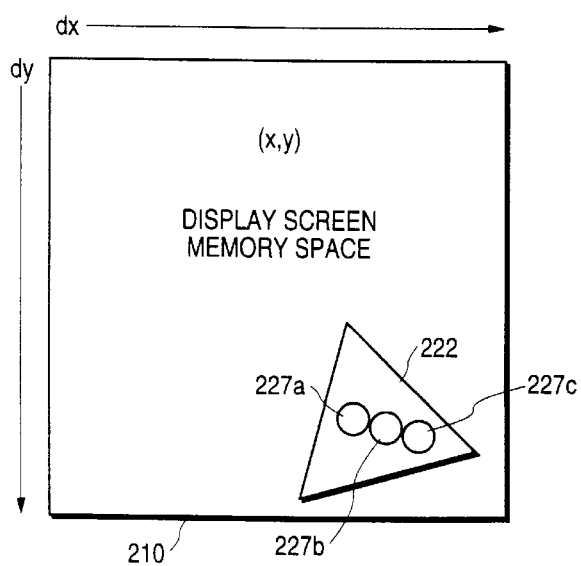

FIG. 5B illustrates the display coordinates of a display screen 105 and these coordinates are expressed in (x, y) coordinates as is well known in the art. An exemplary polygon primitive 222 is shown in display space 210. The exemplary polygon primitive 222 includes three exemplary picture elements ("pixels") 227a–227c. Texel mapping procedures of the present invention are used to provide surface detail for exemplary polygon 222 in a manner that reduces sparkling. Specifically, the manner in which texel colors are obtained in accordance with the present invention that correspond to these pixels 227a–227c is described to follow.

Figure 1A:
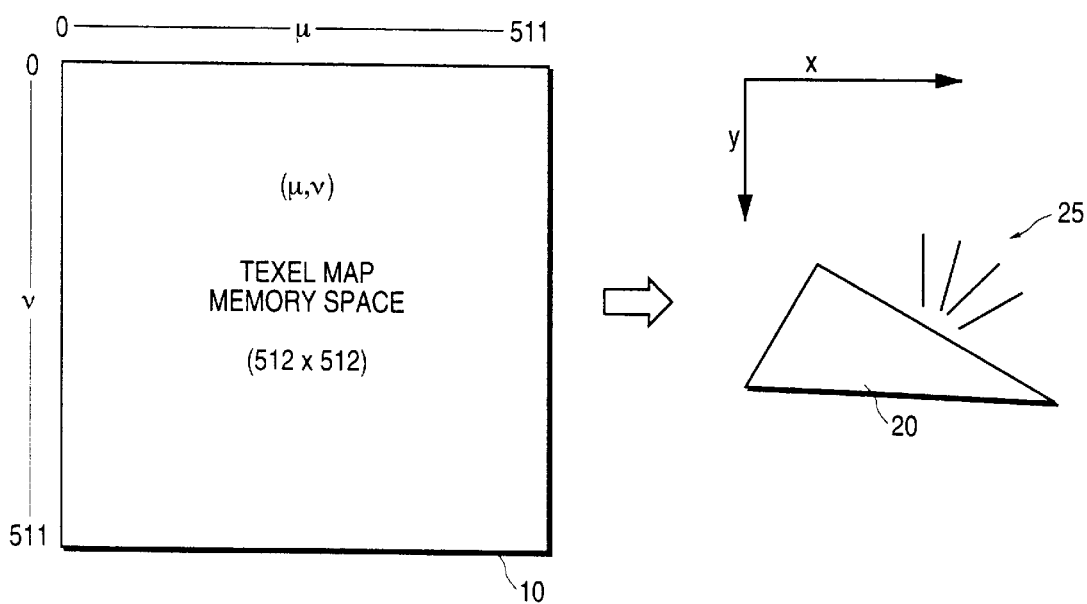
FIG. 1A illustrates a rendering situation in which a relatively large texel map is used for texture mapping on a relatively small displayed polygon, e.g., a large footprint example.
Figure 1B:
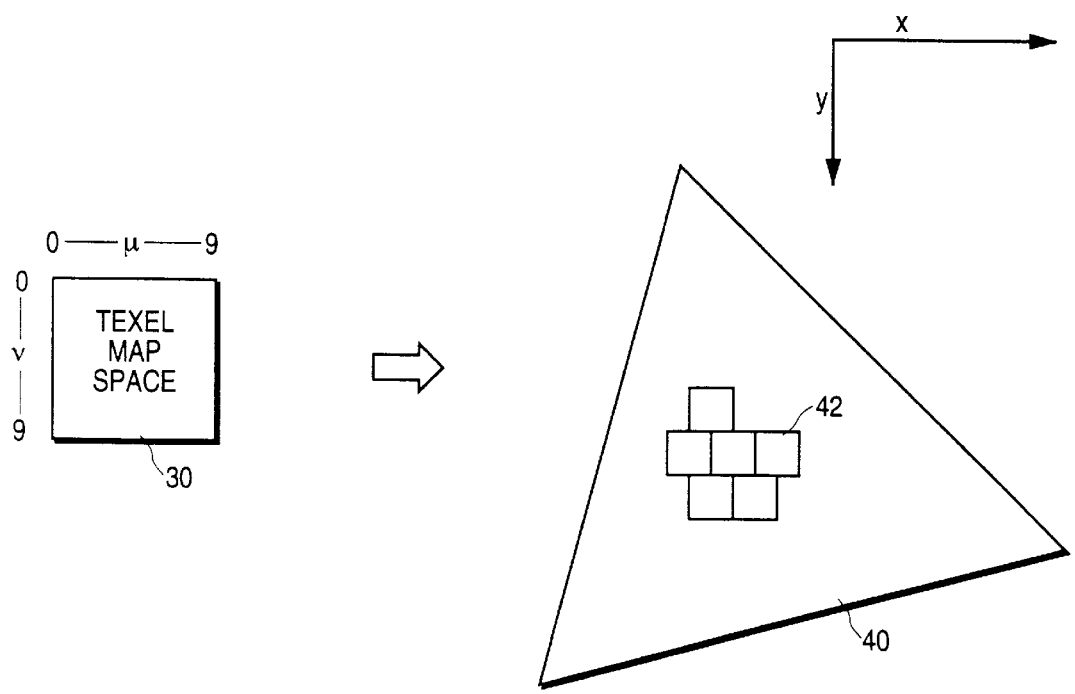
FIG. 1B illustrates a rendering situation in which a relatively small texel map is used for texture mapping on a larger displayed polygon, e.g., a small footprint example.
Figure 2:
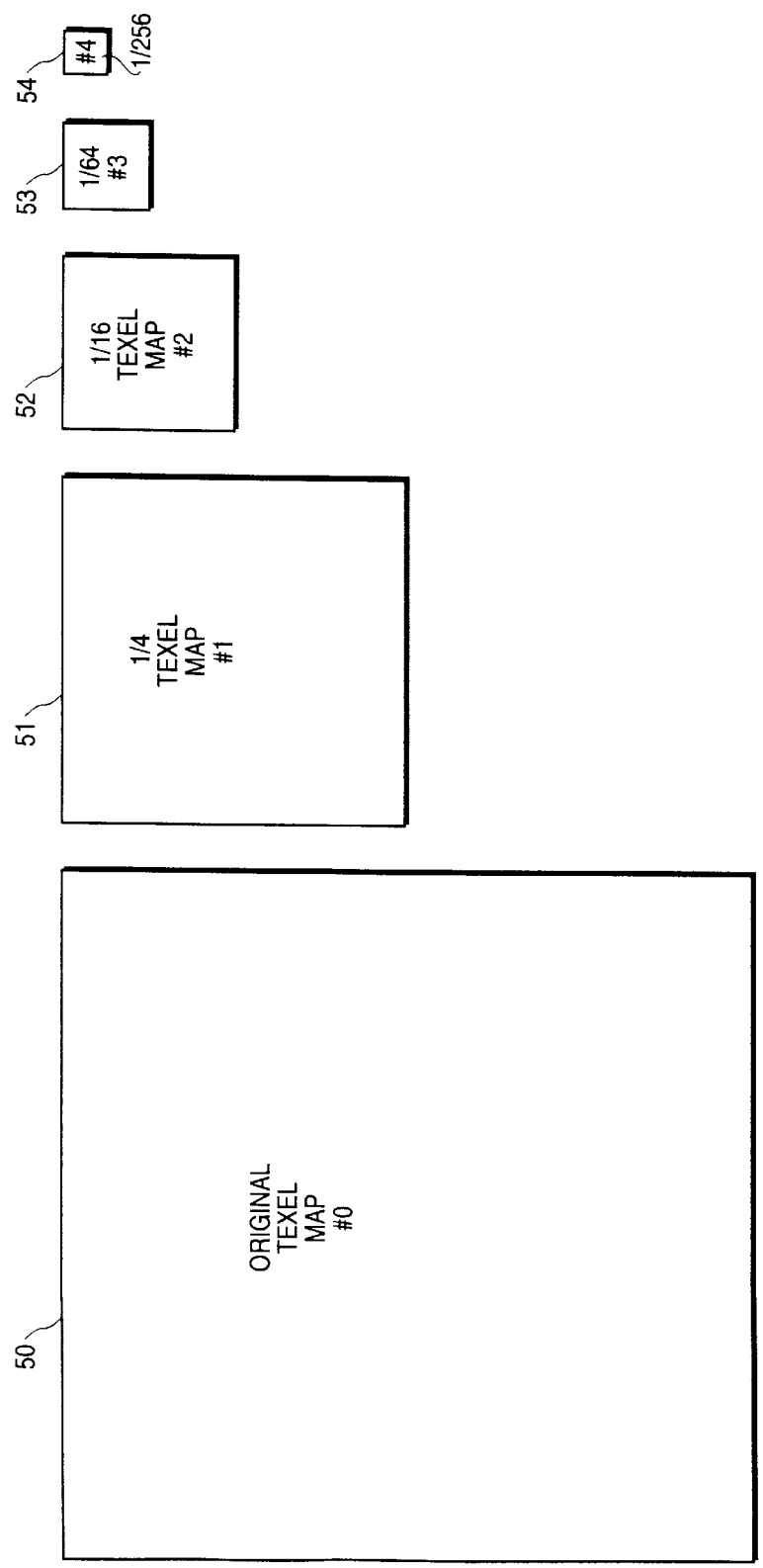
FIG. 2 illustrates exemplary mipmaps and their respective sizes used within the prior art mipmapping technique.
Figure 3:
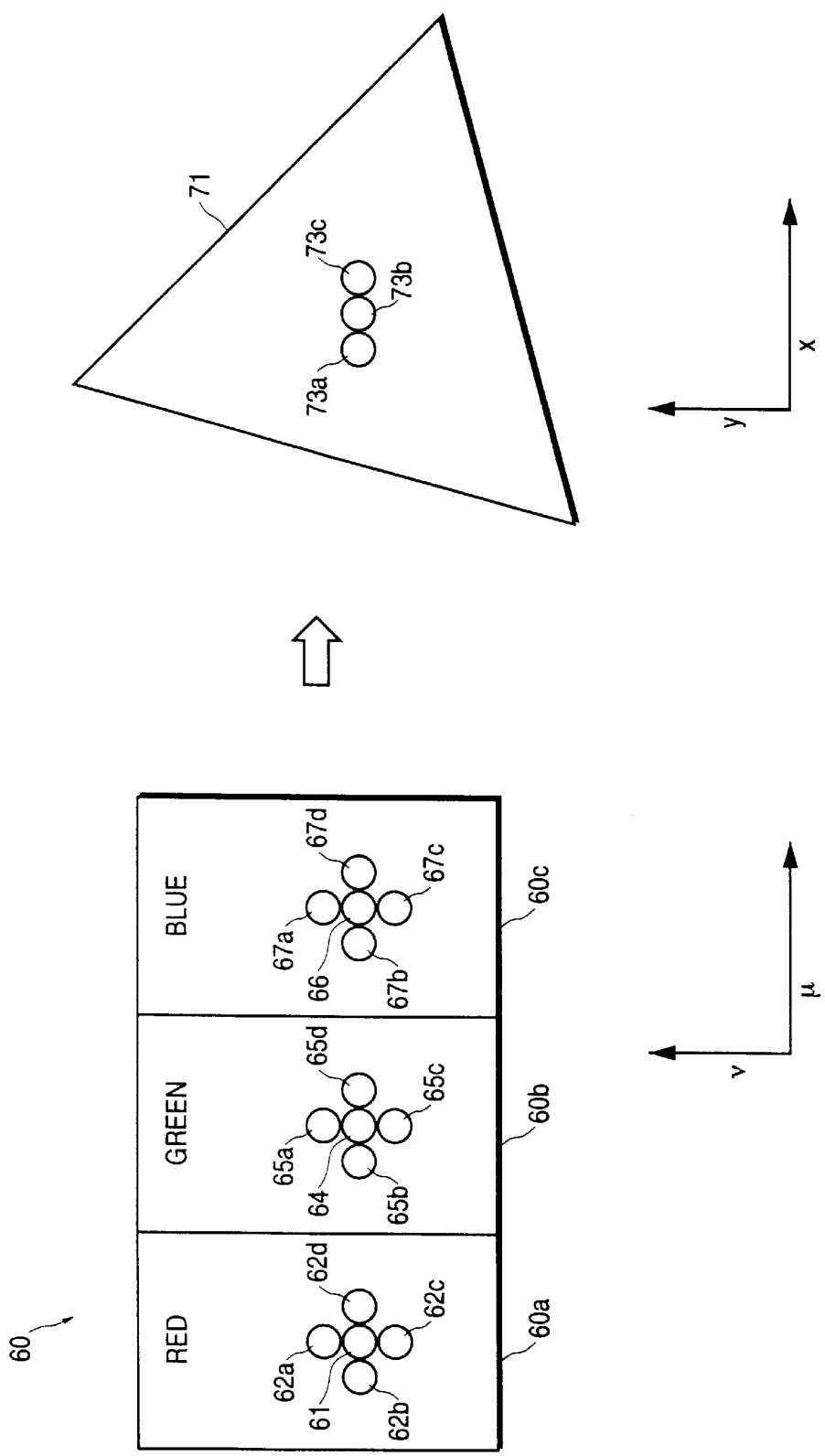
FIG. 3 illustrates an exemplary texture map and exemplary pixels used in the bilinear filtering technique used to reduce blocky image quality in the rendering situation of FIG. 1B.

The concept of footprint area is now described. Footprint area, as defined herein, is the area of a texel map required for a corresponding unit change in display coordinates (x, y) for a particular polygon. In other words, a footprint area is that area of a texel map spanned during sampling for a single screen pixel. In the rendering situation of FIG. 1A, the footprint area is less than one. However, in the rendering situation of FIG. 1B, the footprint area is greater than one because large distances of texel space are spanned between texel sample points (e.g., between pixels). Footprint area can be expressed in terms of du and dv because, during rasterization, pixels are updated individually and (dy×dx) is usually not greater than one. The footprint of a texture map for a particular polygon is therefore expressed as:

Footprint Area=(du×dv)

where du is the change in u texel dimension for a change in x and dv is the change in v texel dimension for a change in y. As described below, the present invention is particularly useful for reducing texel sparkling when texture mapping polygons with a large footprint area. The present invention is also especially effective at reducing texel sparkling when a texture map of low color frequency is employed.

Figure 6A:
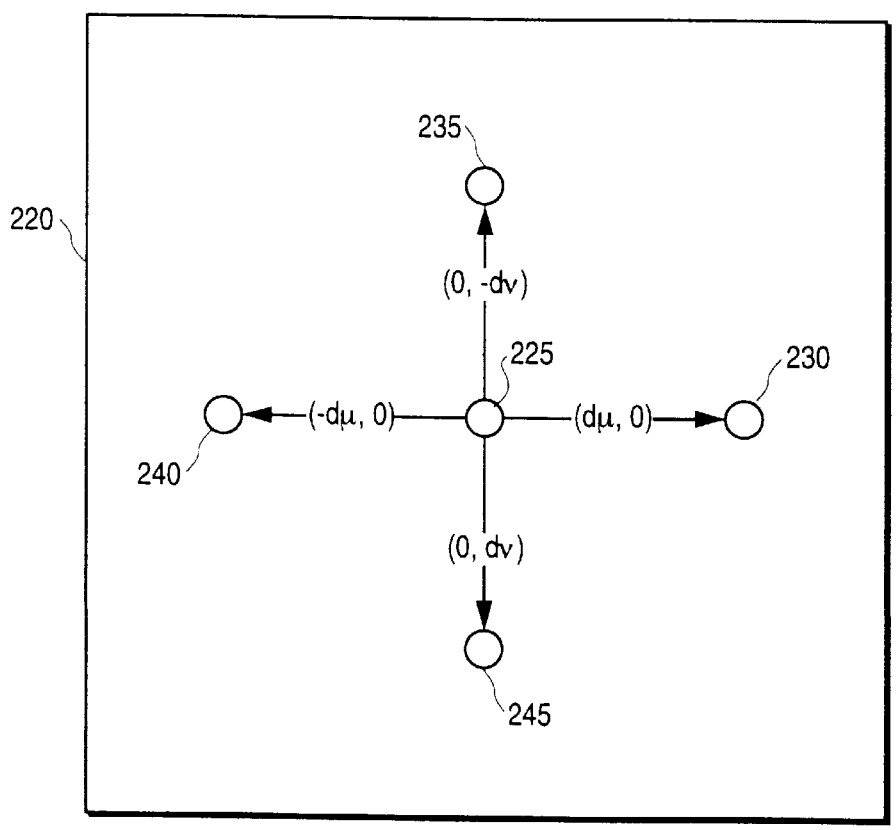
FIG. 6A is an illustration of a set of texels of a texture map selected in accordance with one embodiment of the present invention for performing texture filtering to reduce sparkling.

FIG. 6A illustrates an exemplary texture map 220 used in accordance with one embodiment of the present invention. Texel 225 represents an exemplary sampled texel (u, v) corresponding to a display pixel of a polygon. In one example, sample texel 225 corresponds to pixel 227a, but could be generalized within the present invention to apply to any pixel of display space 210 (FIG. 5B). In accordance with one embodiment of the present invention, during texture mapping, the colors of a set of texels located at sample distances du and dv away from the sample texel 225 are color averaged with the color of the sample texel 225 to arrive at an output texel value for the corresponding pixel. In one embodiment, the texels at sample distances du and dv away from the sample texel 225 include texel 230 located at coordinate (u+du, v) and texel 235 located at coordinate (u, v−dv) and texel 240 located at coordinate (u−du, v) and texel 245 located at coordinate (u, v+dv). Texel 230 is located (du, 0) away from sample texel 225, texel 235 is located (0, −dv) away from sample texel 225, texel 240 is located (−du, 0) away from sample texel 225 and texel 245 is located (0, dv) away from sample texel 225.

Texels located at du and dv away from the sample texel 225 are located at "sample distance" away from the currently sampled texel (the sample texel) because when sampling a particular texel at a coordinate (u, v) of a texel map, the distance in texel coordinates to the next sampled texel is expressed as (du, dv). Typically during rendering of texture maps with footprints larger than one, the distance between updated pixels in (x, y) coordinate space is 1 or 0 while the texel map can be sampled through du and dv amounts which are larger than 1. Therefore, texels 230, 235, 240 and 245 are said to be located at "sample distances" away from sample texel 225 because they are located a distance du or dv away from sample texel 225. During well known rendering processes, as each (x, y) pixel is processed, processes and/or specialized graphics hardware generate the du, dv values required for the pixel and supply this value to the present invention.

Within this embodiment of the present invention, the color values of five texels, 225–245, are color averaged to obtain an output texel value corresponding to the sampled texel 225. This is performed for each texel color sampled. By averaging texels located at sample distances away from the sample texel, rather than averaging nearest neighbor texels to the sample texel (as done in bilinear filtering), the present invention advantageously averages color values which are closer to the colors of adjacent pixels displayed on the display screen 105. This reduces display sparkling for texel maps having low color frequency. Furthermore, the present invention is effective at reducing display sparkling without the additional memory overhead required of mipmapping techniques.

It is appreciated that the values du and dv are typically given during the rasterization process for a given pixel. A number of different processes and specialized graphics circuitry can be used within the scope of the present invention for determining u, v, du and dv for a given pixel during a rasterization process and a few exemplary processes are described with reference to FIG. 10.

Figure 6B:
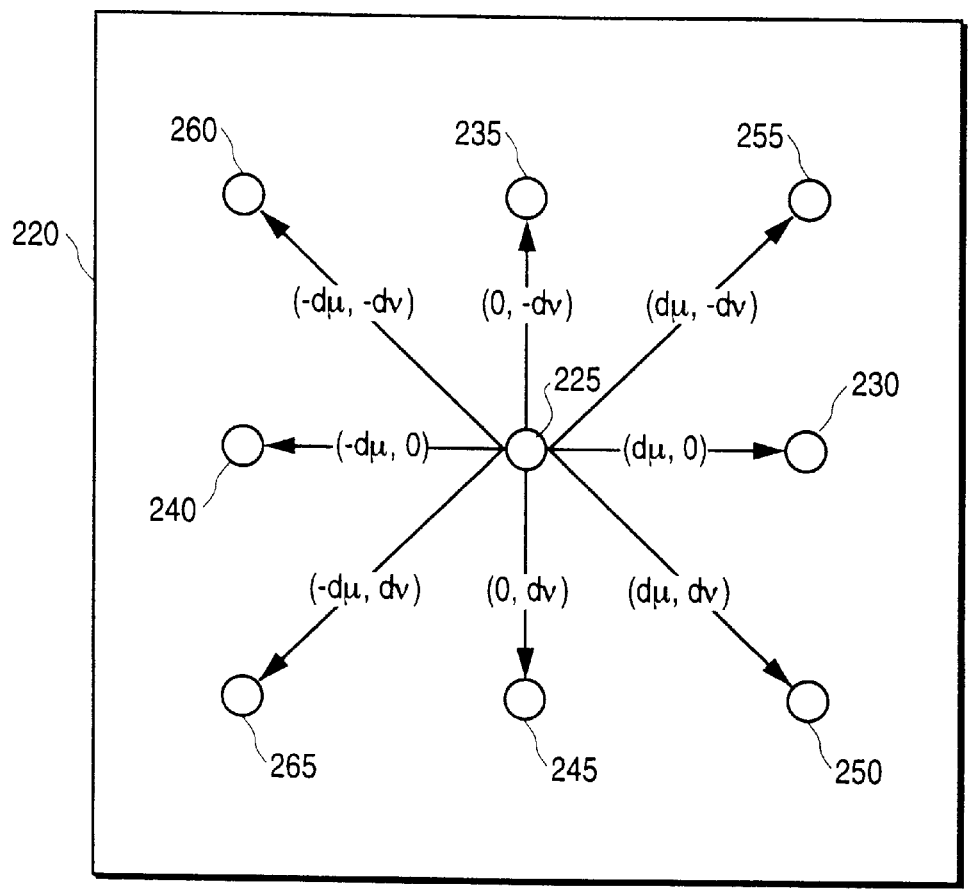
FIG. 6B is an illustration of a set of texels of a texture map selected in accordance with another embodiment of the present invention for performing texture filtering to reduce sparkling.

Another embodiment of the present invention is illustrated with respect to FIG. 6B. In this embodiment, the set of texels located a sample distance away from the sample texel include four additional texels 250, 255, 260 and 265 located du and dv away from the sample texel 225. FIG. 6B illustrates the exemplary texel map 220, the sample texel 225 and texels 230–265 which are all located a sample distance away from sample texel 225. Specifically, texel 250 is located at coordinate (u+du, v+dv) and texel 255 is located at coordinate (u+du, v−dv) and texel 260 is located at coordinate (u−du, v−dv) and texel 265 is located at coordinate (u−du, v+dv). Texel 250 is located (du, dv) away from sample texel 225, texel 255 is located (du, −dv) away from sample texel 225, texel 260 is located (−du, −dv) away from sample texel 225 and texel 265 is located (−du, dv) away from sample texel 225. Within this embodiment of the present invention, the color values of nine texels, 225–265, are color averaged to obtain an output texel value corresponding to the sampled texel 225. This is performed for each texel color sampled.

Figure 7A:
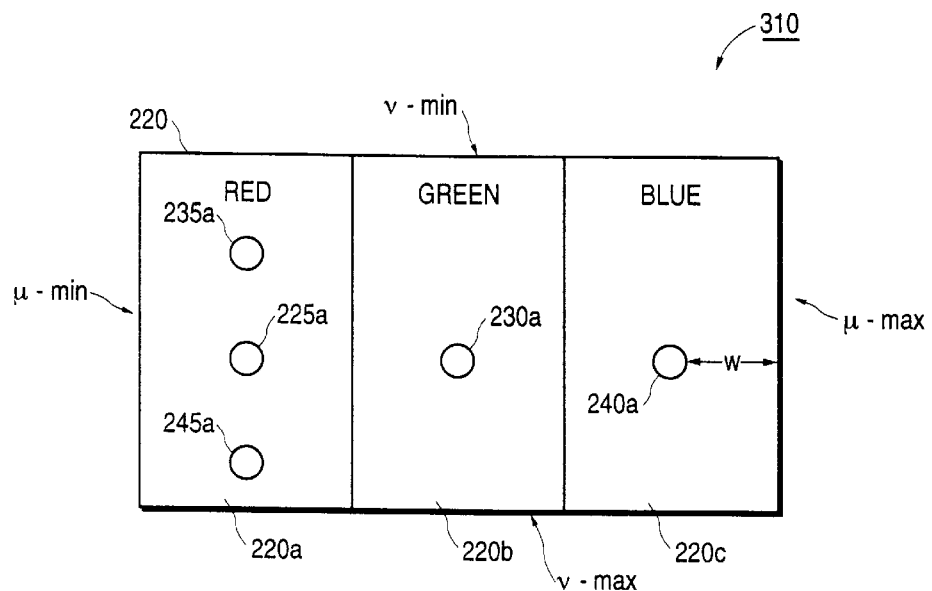
FIG. 7A illustrates an exemplary set of texels used for determining a color value of a first sampled texel in accordance with one embodiment of the present invention that allows texel wrap.

FIG. 7A illustrates a set of texels 310 selected in accordance with one embodiment of the present invention. A low color frequency texture map 220 is shown having a red portion 220a, a green portion 220b and a blue portion 220c. A sample texel 225a is located at the (u, v) coordinate and this texel corresponds to the rendering of first pixel 227a (FIG. 5B) of polygon 222. In accordance with the present invention, sample pixels 230a, 235a, 240a and 245a are obtained from the texel map 220. Texel 230a is located at coordinate (u+du, v); and texel 235a is located at coordinate (u, v−dv); and texel 245a located at coordinate (u, v+dv).

In this embodiment, texel wrap around ("texel wrap") is allowed. In texel wrap, when a texel coordinate falls outside of the texel map space, it becomes wrapped around and displaced away from the opposite edge. Therefore, if a texel is to be placed off the left edge of texel map 220 by an amount w, then it is placed w away from the right edge of texel map 220 thereby effectively wrapping around the texel map. Therefore, texel 240a is located a distance away from the right edge of texel map 220 as shown in FIG. 7A. Assuming the value u−du was to be w past the minimum u coordinate value (u min), then the u coordinate of texel 240a is selected to be w from the maximum u coordinate value or u_max−w. In this example, the v coordinate of texel 240a is merely v. The resulting coordinate value for texel 240a is then (u_max−w, v). The texel color obtained for sample texel 225a in this embodiment is then the average colors of texels 225a–245a. It is appreciated that texel wrapping can occur in either the u or v direction.

Figure 7B:
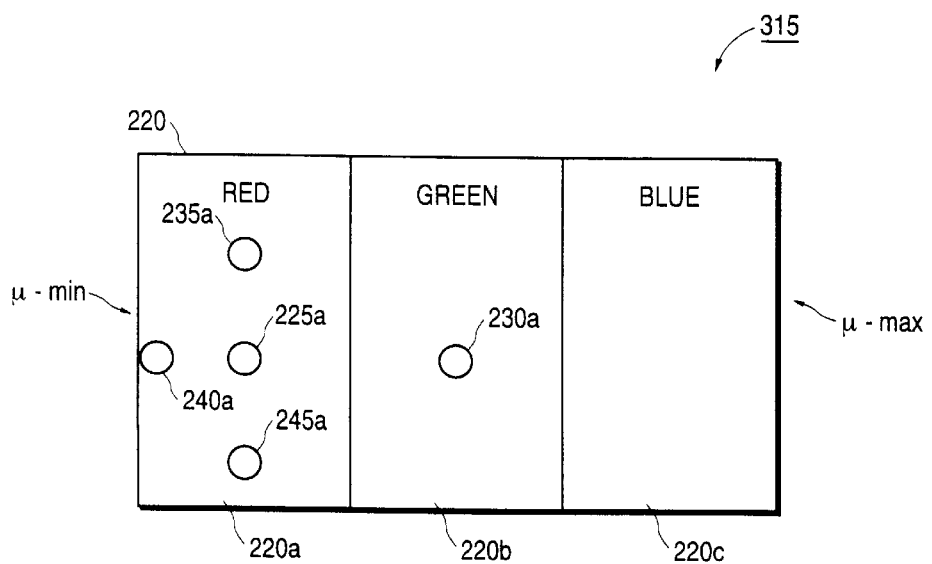
FIG. 7B illustrates an exemplary set of texels used for determining a color value of a first sampled texel in accordance with one embodiment of the present invention that does not allow texel wrap.

The set of texels 315 of FIG. 7B illustrates an embodiment of the present invention similar to that of FIG. 7A except texel wrapping is not allowed. In this embodiment, a texel is "pinned" to the edge of the coordinate it exceeds in value. Therefore, since texel 240a exceeds the u_min coordinate, it becomes pinned to this edge as shown in FIG. 7B. The resulting coordinate value for texel 240a is (u_min, v). The texel color obtained for sample texel 225a in this embodiment is then the average colors of texels 225a–245a. It is appreciated that texel wrapping can occur in either the u or v direction.

Figure 8A:
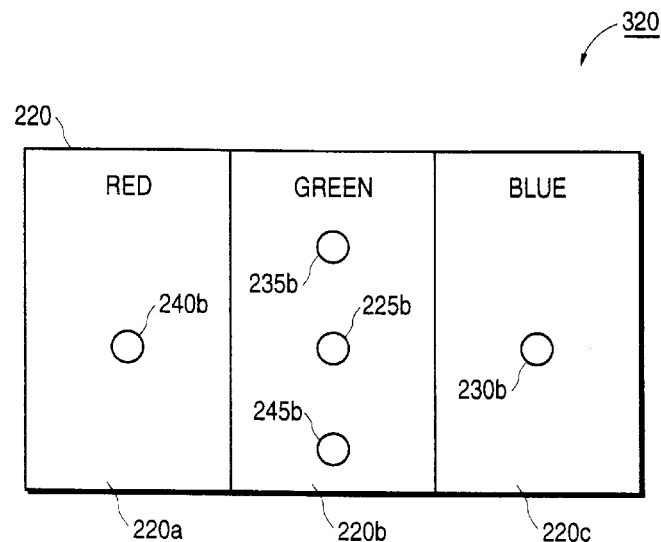
FIG. 8A illustrates an exemplary set of texels used for determining a color value of a second sampled texel in accordance with one embodiment of the present invention that allows texel wrap.

FIG. 8A illustrates a set of texels 320 selected in accordance with one embodiment of the present invention. The low color frequency texture map 220 is shown having a red portion 220a, a green portion 220b and a blue portion 220c. A sample texel 225b is located at the (u, v) coordinate and this texel corresponds to the rendering of second pixel 227b (FIG. 5B) of polygon 222. In accordance with the present invention, sample pixels 230b, 235b, 240b and 245b are obtained from the texel map 220. Texel 230b is located at coordinate (u+du, v); and texel 235b is located at coordinate (u, v−dv); texel 245b located at coordinate (u, v+dv) and texel 240b is located at coordinate (u−du, v).

In this embodiment, texel wrap around ("texel wrap") is allowed but no texel exceeds the u or v coordinate boundary. The texel color obtained for sample texel 225b in this embodiment is then the average colors of texels 225b–245b.

Figure 8B:
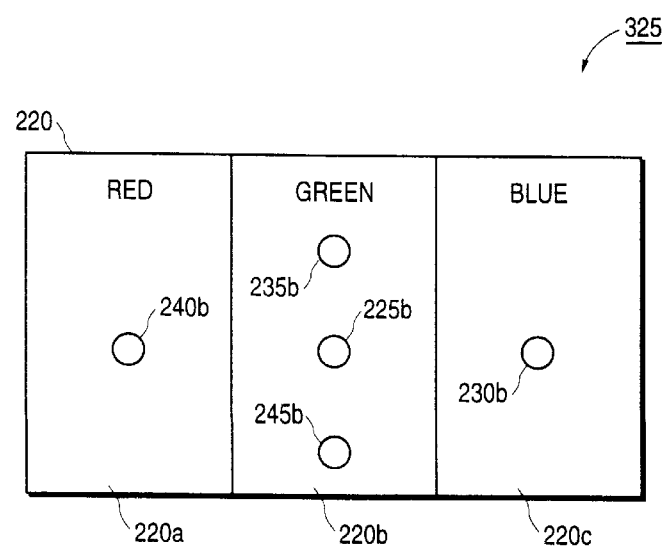
FIG. 8B illustrates an exemplary set of texels used for determining a color value of a second sampled texel in accordance with one embodiment of the present invention that does not allow texel wrap.

The set of texels 325 of FIG. 8B illustrates an embodiment of the present invention similar to that of FIG. 8A except texel wrapping is not allowed and texels exceeding a coordinate boundary are pinned to the relevant edge. However, since no texel exceeds the u or v coordinate boundary in this example, no texel becomes pinned to any edge. The result is the same texel configuration of FIG. 8A. The texel color obtained for sample texel 225a in this embodiment is then the average colors of texels 225b–245b.

Figure 9A:
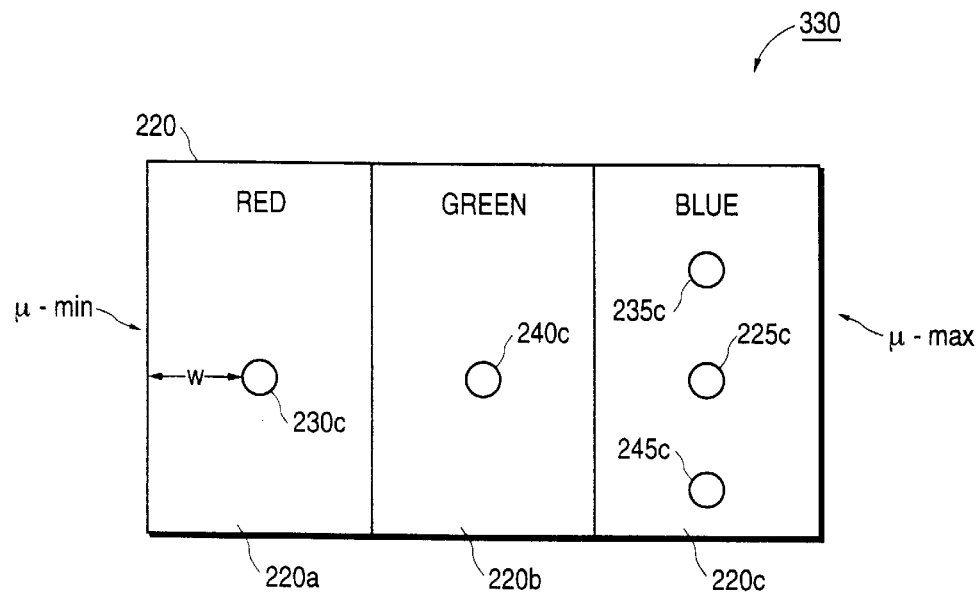
FIG. 9A illustrates an exemplary set of texels used for determining a color value of a third sampled texel in accordance with one embodiment of the present invention that allows texel wrap.

FIG. 9A illustrates a set of texels 330 selected in accordance with one embodiment of the present invention. The low color frequency texture map 220 is shown having a red portion 220a, a green portion 220b and a blue portion 220c. A sample texel 225c is located at the (u, v) coordinate and this texel corresponds to the rendering of third pixel 227c (FIG. 5B) of polygon 222. In accordance with the present invention, sample pixels 230c, 235c, 240c and 245c are obtained from the texel map 220. Texel 235c is located at coordinate (u, v−dv); texel 245c located at coordinate (u, v+dv); and texel 240c is located at coordinate (u−du, v).

In this embodiment, texel wrap around ("texel wrap") is allowed. In texel wrap, when a texel coordinate falls outside of the texel map space, it becomes wrapped around and displaced away from the opposite edge. Therefore, if a texel is to be placed off the right edge of texel map 220 by an amount w, then it is placed w away from the left edge of texel map 220 thereby effectively wrapping around the texel map. Therefore, texel 230c is located a distance away from the left edge of texel map 220 as shown in FIG. 9A. Assuming the value u+du was to be w past the maximum u coordinate value (u_max), then the u coordinate of texel 230c is selected to be w from the minimum u coordinate value or u_min+w. In this example, the v coordinate of texel 230c is merely v. The resulting coordinate value for texel 230c is then (u_min+w, v). The texel color obtained for sample texel 225c in this embodiment is then the average colors of texels 225c–245c. It is appreciated that texel wrapping can occur in either the u or v direction.

Figure 9B:
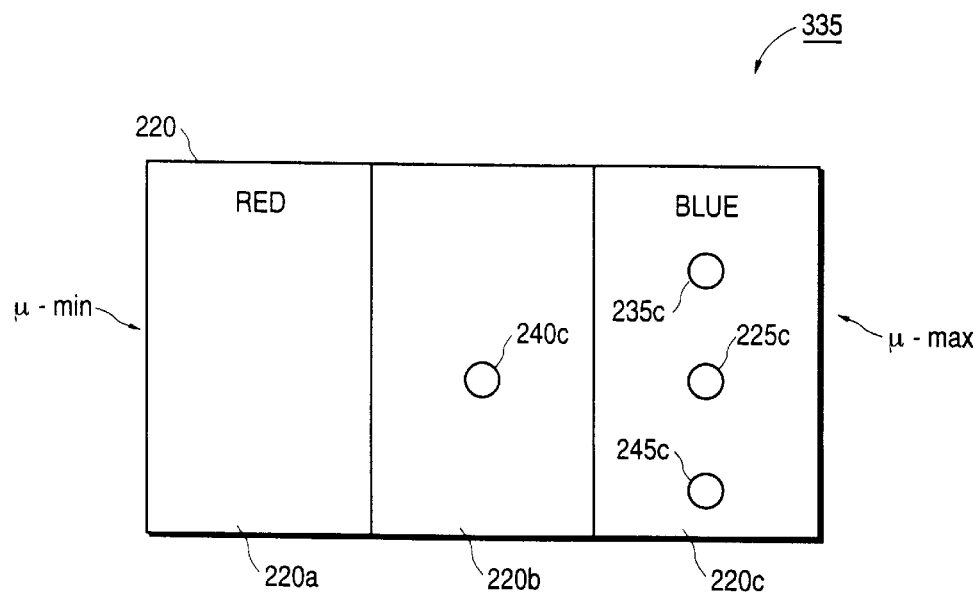
FIG. 9B illustrates an exemplary set of texels used for determining a color value of a third sampled texel in accordance with one embodiment of the present invention that does not allow texel wrap.

The sample configuration 335 of FIG. 9B illustrates an embodiment of the present invention similar to that of FIG. 9A except texel wrapping is not allowed. In this embodiment, a texel is "pinned" to the edge of the coordinate it exceeds in value. Therefore, since texel 230c exceeds the u_max coordinate, it becomes pinned to this edge as shown in FIG. 9B. The resulting coordinate value for texel 240a is (u_max, v). The texel color obtained for sample texel 225c in this embodiment is then the average colors of texels 225c–245c. It is appreciated that texel wrapping can occur in either the u or v direction.

The resulting pixel colors attributed to texture mapping for exemplary polygon 222 (FIG. 5B) are as follows. First pixel 227a is an average color weighted more heavily toward red/green. The second pixel 227b is an average color weighted toward green but having blue and red. Third pixel 227c is an average color weighted more heavily toward green/blue. Instead of an unfiltered image, the result of the present invention is a filtered image and the high color frequency is removed from the polygon 222. This is the case because the present invention is filtering (averaging) with the texels that are actually sampled during texture mapping processes for each screen pixel rather than filtering with just the texels that are the nearest neighbors in texel space (as done by bilinear filtering). It is appreciated that the texels that are actually sampled during texture mapping processes are those texels that are located du and dv away from the currently sampled texel at the (u, v) texel coordinate.

Figure 10:
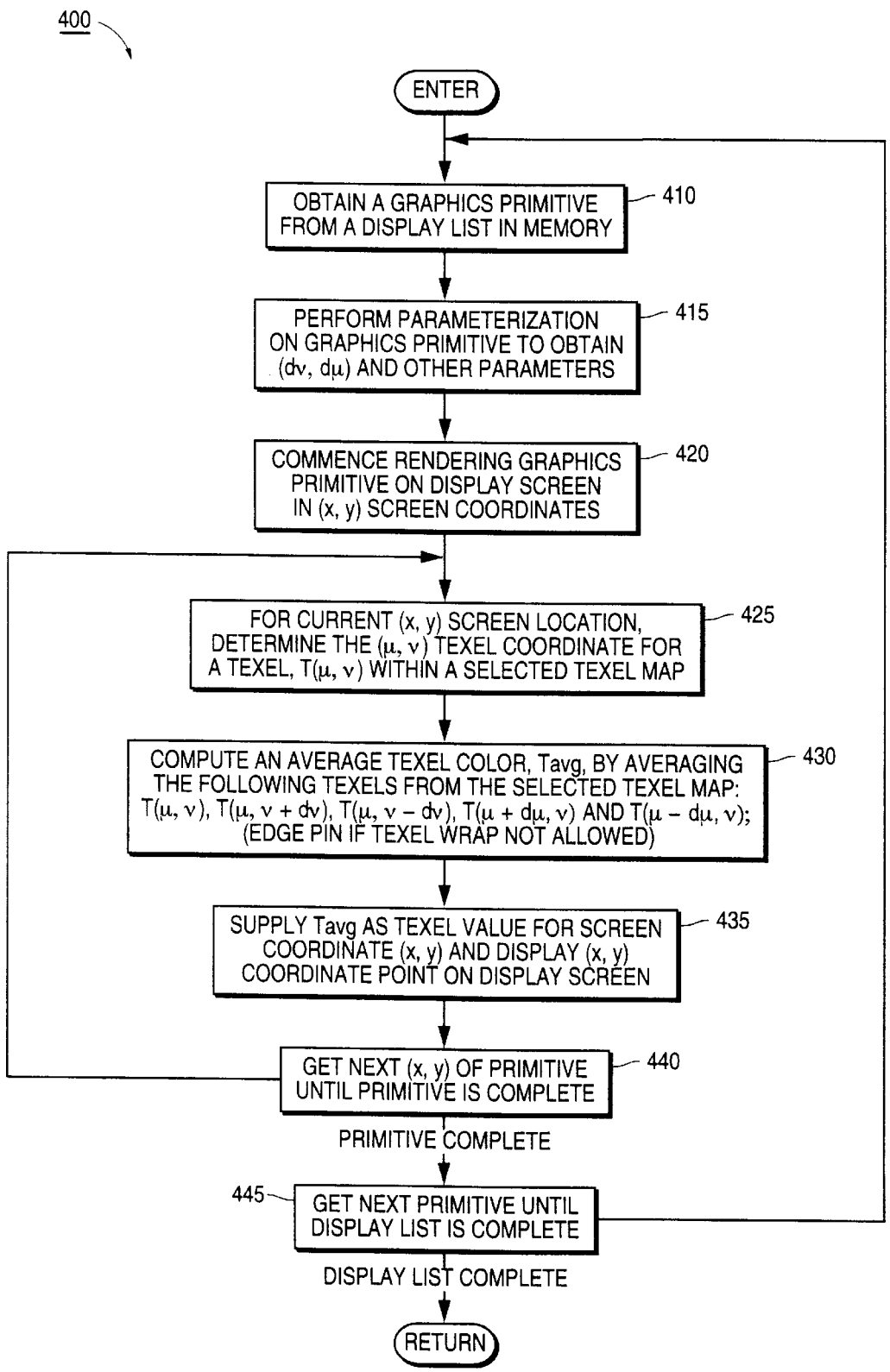
FIG. 10 is a flow diagram of steps in accordance with one embodiment of the present invention that performs texel averaging in accordance with the set of texels of FIG. 6A.

FIG. 10 illustrates a flow diagram of steps of a process 400 in accordance with one embodiment of the present invention that can be implemented as software and/or specialized high-speed hardware within computer controlled graphics system 112. Process 400 is implemented to perform color averaging with the sample texel and with the four texels that are located at sample distances away from the sample texel as shown in FIG. 6A. At step 410, the present invention obtains a graphics primitive (e.g., polygon) from a display list in computer memory. The graphics primitive typically contains a number of vertices and three dimensional coordinates and other attributes (e.g., color values and texel coordinates) for each vertex. At step 410, the texel map associated with the current graphics primitive is also received. A number of well known procedures, including specialized rasterization circuits, can be used to implement step 410.

At step 415, the present invention performs parameterization of the polygon including translating the polygon to a two dimensional representation. Among the parameters produced at step 415 are texel coordinates (u, v) for each vertex as well as dv value and/or functions for computing these values for each pixel of the polygon. Although a number of different parameterization processes and/or parameterization circuitry can be used at step 415 in accordance with the present invention, particular parameterization processes that can be used are described in the following: co-pending U.S. patent application Ser. No. 08/777,558 filed Dec. 30, 1996 and entitled "Method for Computing Parameters Used in a Non-Homogeneous Second Order Perspective Texture Mapping Process Using Interpolation," by Einkauf et al.; co-pending U.S. patent application Ser. No. 08/774,787 filed Dec. 30, 1996 and entitled "Non-Homogeneous Second Order Perspective Texture Mapping Using Linear Interpolation Parameters," by Vaswani, et. Al; and co-pending U.S. patent application Ser. No. 08/777,556 filed Dec. 30, 1996, entitled "Circuit for Determining Non-Homogeneous Second Order Perspective Texture Mapping Coordinates Using Linear Interpolation," by Vaswani et al., all incorporated herein by reference.

At step 420 of FIG. 10 the present invention commences rendering the polygon on the display screen 105 after having performed the required parameterizations. In particular, a current pixel (x, y) is selected for display on the display screen 105. At step 525, the present invention determines the particular (u, v) texel coordinate for a texel, T, that corresponds to the current pixel at the screen coordinate (x, y). A number of well known procedures can be used to perform this step including those described in the above referenced patent applications.

At step 430, the present invention then computes an average or "filtered" texel color, Tavg, based on the averaging the colors of the set of texels of the selected texel map that are a sample distance away from the current texel at (u, v). In this embodiment, as shown in FIG. 6A, the colors of only five texels are averaged and they are located at the following texel coordinate locations: (u, v), (u, v+dv), (u, v−dv), (u+du, v), and (u−du, v). The following illustrates the relationship:

$$Tavg{=}Average[T(u, v){+}T(u, v{+}dv){+}T(u, v{-}dv){+}T(u{+}du, v){+}T(u{-}du, v)]$$

If texel wrap is allowed within system 112, then the selected texel map car be wrapped around in either the u or the v dimension as needed. If texel wrap is not allowed, then the texel violating a texel edge is pinned to that edge as described above with respect to FIG. 7B and FIG. 9B. Texel wrapping or texel pinning can happen with respect to the u or v texel coordinate dimension.

In addition to the average function shown above, a number of well known color weighting average functions can be applied at step 430 to produce Tavg. At step 435, the resulting texel color, Tavg, is then supplied as an output. The color, Tavg, is then used as the texel color component for rendering the current pixel at the (x, y) screen coordinate. The display is displayed on screen 105.

At step 440 of FIG. 10, the present invention gets the next pixel of the current polygon to render on screen 105 and returns to step 425 to process this next pixel. If the last pixel of the current polygon has already been processed, then step 445 is entered from step 440. At step 445, the next primitive is obtained and step 410 is re-entered. If the last primitive of the display list has been processed at step 445, then process 400 returns.

Steps 425-445 can be implemented as instructions stored in computer readable memory units of system 112 and/or can be realized by texture mapping circuits within unit 109 of system 1 12. 20

Figure 11:
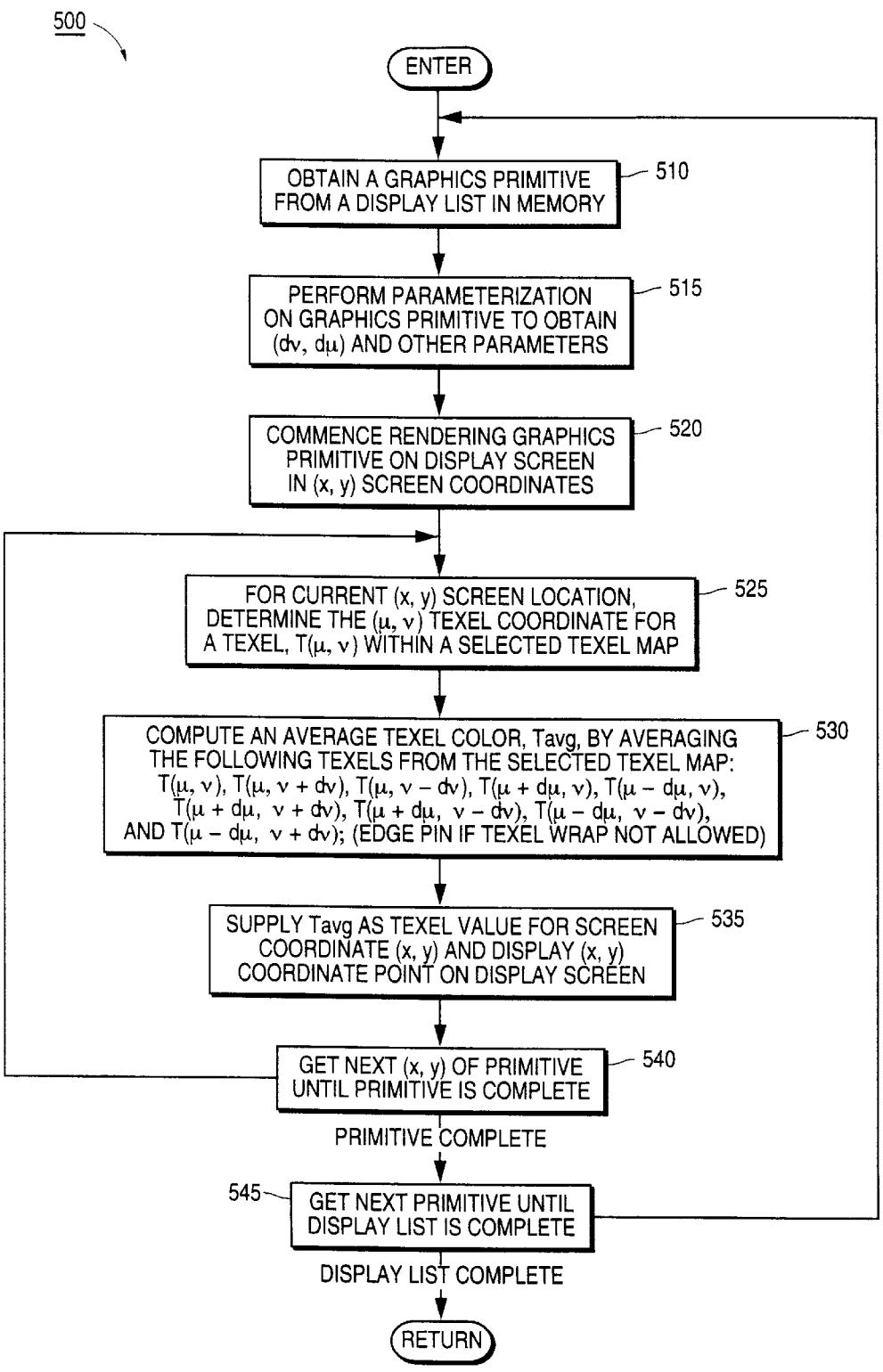
FIG. 11 is a flow diagram of steps in accordance with one embodiment of the present invention that performs texel averaging in accordance with the set of texels of FIG. 6B.

FIG. 11 illustrates a flow diagram of steps of a process 500 in accordance with another embodiment of the present invention that are implemented on computer controlled graphics system 112. Process 500 is analogous to process 400 except process 500 is implemented to perform 25 color averaging with the sample texel and with the eight texels that are located at sample distances away from the sample texel as shown in FIG. 6B.

Steps 510–525 are analogous to steps 410–425. At step 530 of FIG. 11, the present invention then computes an average or "filtered" texel color, Tavg, based on the averaging the colors of a set of texels of the selected texel map that are a sample distance away from the current texel at (u, v). In this embodiment, as shown in FIG. 6B, the colors of nine texels are averaged and they are located at the following texel coordinate locations: (u, v), (u, v+dv), (u, v−dv), (u+du, v), (u−du, v), (u+du, v+dv), (u+du, v−dv), (u−du, v+dv) and (u−du, v−dv). The following illustrates the relationship:

$$Tavg\ Average[T(u, v){+}T(u, v{+}dv){+}T(u, v{-}dv){+}T(u{+}du, v){+}T(u{-}du, v){+}T(u{+}du, v{+}dv){+}T(u{+}du, v{-}dv){+}T(u{-}du, v{+}dv){+}T(u{-}du, v{-}dv)]$$

If texel wrap is allowed within system 112, then the selected texel map can be wrapped around in either the u or the v dimension as needed. If texel wrap is not allowed, then the texel violating a texel edge is pinned to that edge as described above with respect to FIG. 7B and FIG. 9B. Texel wrapping or texel pinning can happen with respect to the u or v texel coordinate dimension.

At step 535, the resulting texel color, Tavg, is then supplied as an output. The color, Tavg, is then used as the texel color component for rendering the current pixel at the (x, y) screen coordinate. The display is displayed on screen 105. Steps 540 and 545 are analogous to steps 440 and 445. Steps 525–545 can be implemented as instructions stored in computer readable memory units of system 112 and/or can be realized by texture mapping circuits within unit 109 of system 112.

Figure 12:
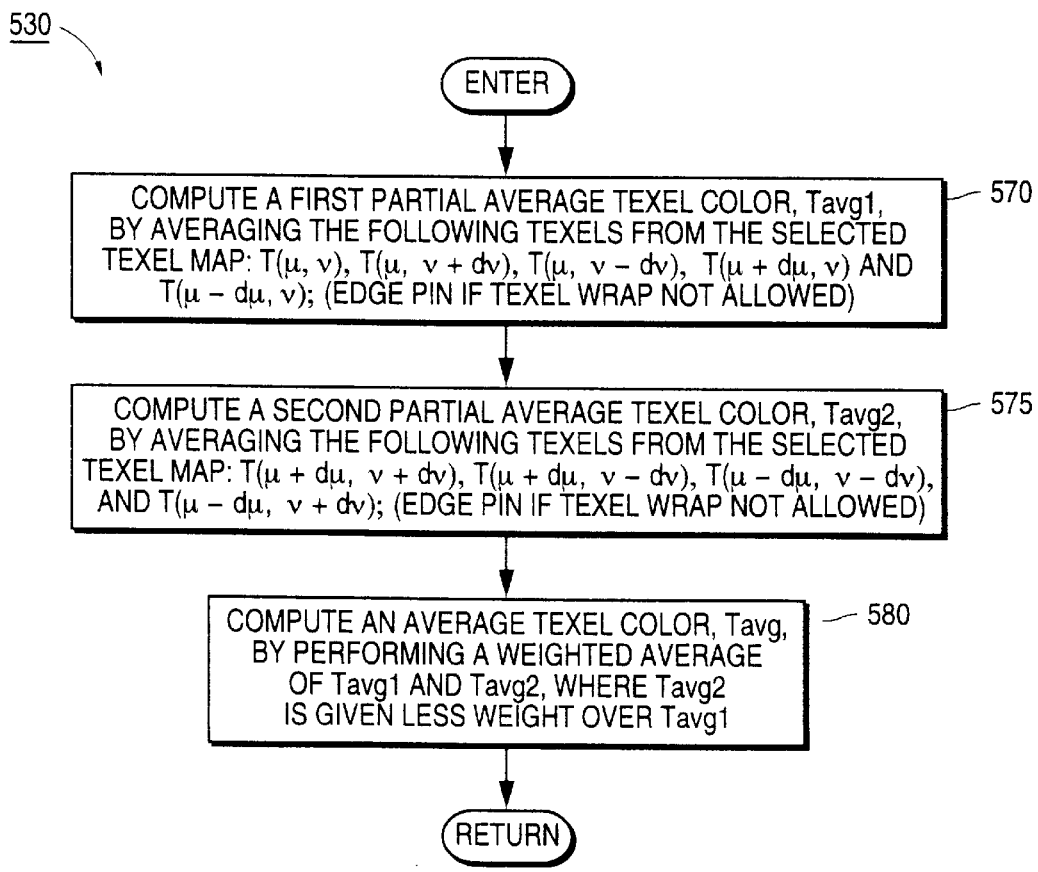
FIG. 12 illustrates an embodiment of color averaging in accordance with the embodiment of the present invention shown in FIG. 11.

In addition to the average function shown above for step 530, a number of well known color weighting average functions can be applied at step 530 to produce Tavg. On such average weighting function is illustrated in the process of FIG. 12. FIG. 12 illustrates one averaging weighting function that can be implemented for step 530. With respect to this weighting average, texels that are located "closer" in texel space to the currently sampled texel are given more weight over those that are "farther away" in texel space.

At step 570, the present invention performs a first partial average to obtain a first partial average color, Tavg1, by averaging the texels as shown in FIG. 6A. These texels include the currently sampled texel (u, v) and those considered to be at a relatively closer sample distance away. At step 570, five texels are averaged and they are located at the following texel coordinate locations: (u, v), (u, v+dv), (u, v−dv), (u+du, v), and (u−du, v). The following illustrates the relationship:

$$Tavg1{=}Average[T(u, v){+}T(u, v{+}dv){+}T(u, v{-}dv){+}T(u{+}du, v){+}T(u{-}du, v)]$$

If texel wrap is allowed within system 112, then the selected texel map can be wrapped around in either the u or the v dimension as needed. If texel wrap is not allowed, then the texel violating a texel edge is pinned to that edge as described above with respect to FIG. 7B and FIG. 9B. Texel wrapping or texel pinning can happen with respect to the u or v texel coordinate dimension.

At step 575 of FIG. 12, the present invention then performs a second partial average to obtain a second partial average color, Tavg2, by averaging the texels located at the following texel coordinates: (u+du, v+dv), (u+du, v−dv), (u−du, v+dv) and (u−du, v−dv). These texels are those considered to be at a relatively farther sample distance away from the sample texel. The following illustrates the relationship:

$$Tavg2=Average[T(u+du,\ v+dv)+T(u+du,\ v-dv)+T(u-du,\ v+dv)+T(u-du,\ v-dv)]$$

If texel wrap is allowed within system 112, then the selected texel map can be wrapped around in either the u or the v dimension as needed. If texel wrap is not allowed, then the texel violating a texel edge is pinned to that edge as described above with respect to FIG. 7B and FIG. 9B. Texel wrapping or texel pinning can happen with respect to the u or v texel coordinate dimension.

At step 580, the present invention then determines the average texel color, Tavg, by performing weighted average of Tavg1 and Tavg2. Any of number of well known averaging functions can be used at step 580 and the Tavg2 value is given less weight over the Tavg1 value in the preferred embodiment. Tavg is then the texel component for the current pixel. The following illustrates the relationship:

$$Tavg=Average[(Tavg1 \times weight\_1)+(Tavg2 \times weight2)]$$

where weight_1 is a first weight value and weight_2 is a second weight value of lesser value than weight_1.

It is appreciated that by application of process 400 or process 500 of the present invention, the color of the pixels of the display polygon are filtered with the color of adjacent pixels because texels at sample distances away from the currently sampled texel are color filtered with each other. This effectively reduces the high color frequency within the displayed polygon thereby reducing sparkling in cases where a relatively large texel map is mapping to a smaller polygon and especially in the case where a low color frequency texel map is being used.

The preferred embodiment of the present invention, a texture map filtering process for reducing sparkling when using a large texture map providing texture to a relatively small polygon, is thus described. While the present invention has been described in particular embodiments, it should be appreciated that the present invention should not be construed as limited by such embodiments, but rather construed according to the below claims.

What is claimed is:

1. In a computer controlled graphics display system, a method of performing texture mapping for a graphics primitive comprising the steps of:
   a) determining a set of pixels within said graphics primitive;
   b) texture mapping each respective pixel of said set of pixels based on a texture map wherein said each respective pixel has an x-coordinate and a v-coordinate, said step b) comprising the steps of:
      b1) receiving a first sample distance, du, along a first texel dimension, u, wherein said first sample distance, du, is derived and Proportionally based on a change, dx, in the x-coordinate of a respective pixel and wherein the chance, dx, is derived from a difference between a previous value of the x-coordinate from a previously displayed image of said graphics primitive and a current value of the x-coordinate from a currently displayed image of said graphics primitive;
      b2) receiving a second sample distance, dv, along a second texel dimension, v, wherein said second sample distance, dv, is derived and proportionally based on a change, dv, in the v-coordinate of said respective pixel and wherein the change, dv, is derived from a difference between a previous value of the y-coordinate from a previously displayed image of said graphics primitive and a current value of the y-coordinate from a currently displayed image of said graphics primitive;
      b3) receiving a coordinate (u, v) of a sample texel corresponding to said respective pixel;
      b4) determining colors of a set of texels within said texture map determinedly located at said first and second sample distances away from said coordinate of said sample texel; and
      b5) color averaging said colors determined at step b4) with a color of said sample texel to obtain a texel component for said respective pixel for a subsequently displayed image of said graphics primitive; and
   c) displaying said set of pixels with respective texel components.

2. A method as described in claim 1 wherein said step b4) comprises the step of determining coordinates of said set of texels located at sample distances away from said coordinate of sample texel and, in said step of determining coordinates, wrapping around said texel map any coordinate that exceeds maximum coordinates of said first or said second texel dimensions for said texel map in.

3. A method as described in claim 1 wherein said step b4) comprises the step of determining coordinates of said set of texels located at sample distances away from said coordinate of sample texel and, in said step of determining coordinates, pinning to an edge of said texel map any coordinate that exceeds maximum coordinates of said first or said second texel dimensions for said texel map.

4. A method as described in claim 1 wherein said step b4) determines colors for texels located at (u, v+dv), (u, v−dv), (u+du, v) and (u−du, v) coordinates.

5. A method as described in claim 1 wherein said step b4) determines colors for texels at (u, v+dv), (u, v−dv), (u+du, v), (u−du, v), (u+du, v+dv), (u+du, v−dv), (u−du, v+dv) and (u−du, v−dv) coordinates.

6. A method as described in claim 5 wherein said step b5) comprises the steps of:
   determining a first partial average color of texels at said coordinates of (u, v), (u, v+dv), (u, v−dv), (u+du, v) and (u−du, v);
   determining a second partial average color of the texels at said coordinates of (u+du, v+dv), (u+du, v−dv), (u−du, v+dv) and (u−du, v−dv); and
   determining said texel component by performing a weighted average of said first and said second partial average colors.

7. A method as described in claim 1 wherein said texture map is a low color frequency texture map having a larger texture area than the display area of said graphics primitive.

8. A method as described in claim 1 wherein said graphics primitive is a polygon.

9. In a computer controlled graphics display system, a method of performing texture mapping for a polygon, stored in a display list, said method comprising the steps of:

a) determining a set of pixels within said polygon;
b) texture mapping each respective pixel of said set of pixels based on a texture map wherein said each respective pixel has an x-coordinate and a y-coordinate, said step b) comprising the steps of:
  b1) receiving a first sample distance, du, along a first texel dimension, u, wherein said first sample distance, du, is derived and proportionally based on a change, dx, in the x-coordinate of a respective pixel and wherein the chance, dx, is derived from a difference between a previous value of the x-coordinate from a previously displayed image of said polygon and a current value of the x-coordinate from a currently displayed image of said polygon;
  b2) receiving a second sample distance, dv, along a second texel dimension, v, wherein said second sample distance, dv, is derived and proportionally based on a change, dy, in the y-coordinate of said respective pixel and wherein the change, dy, is derived from a difference between a previous value of the y-coordinate from a previously displayed image of said polygon and a current value of the y-coordinate from a currently displayed image of said polygon;
  b3) receiving a coordinate (u, v) of a sample texel corresponding to said respective pixel;
  b4) determining colors of a set of texels within said texture map determinedly located at (u, v+dv), (u, v−dv), (u+du, v) and (u−du, v) coordinates; and
  b5) color averaging texel colors determined at step b4) with a color of said sample texel to obtain a texel component for said respective pixel for a subsequently displayed image of said polygon; and
c) displaying said set of pixels with respective texel components.

10. A method as described in claim 9 wherein said step b4) comprises the step of determining coordinates of said set of texels located at sample distances away from said coordinate of sample texel and, in said step of determining coordinates, wrapping around said texel map any coordinate that exceeds maximum coordinates of said first or said second texel dimensions for said texel map.

11. A method as described in claim 9 wherein said step b4) comprises the step of determining coordinates of said set of texels located at sample distances away from said coordinate of sample texel and, in said step of determining coordinates, pinning to an edge of said texel map any coordinate that exceeds maximum coordinates of said first or said second texel dimensions for said texel map.

12. A method as described in claim 9 wherein step b4) comprises the step of further determining colors of texels located at (u+du, v+dv), (u+du, v−dv), (u−du, v+dv) and (u−du, v−dv) coordinates.

13. A method as described in claim 12 wherein said step b5) comprises the steps of:
  determining a first partial average color of the color of said texels at coordinates (u, v), (u, v+dv), (u, v−dv), (u+du, v) and (u−du, v);
  determining a second partial average color of the color of said texels at coordinates (u+du, v+dv), (u+du, v−dv), (u−du, v+dv) and (u−du, v−dv); and
  determining said texel component by performing a weighted average between said first and said second partial average colors.

14. A method as described in claim 9 wherein said texture map is a low color frequency texture map having a larger texture area than the display area of said graphics primitive.

15. A computer controlled graphics display system comprising:
  a processor coupled to a bus;
  a computer readable memory system coupled to the bus;
  a rasterization circuit for determining a set of pixels within a graphics primitive stored in said memory system wherein each respective pixel of said set of pixels has an x-coordinate and a y-coordinate;
  a parameterization circuit for determining and supplying a first sample distance, du, along a first texel dimension of a texel map and a second sample distance, dv, along a second texel dimension of said texel map wherein said first sample distance, du, is derived and proportionally based on a change, dx, in the x-coordinate of a respective pixel in which the change, dx, is derived from a difference between a previous value of the x-coordinate from a previously displayed image of said graphics primitive and a current value of the x-coordinate from a currently displayed image of said graphics primitive and wherein said second sample distance, dv, is derived and proportionally based on a chance, dy, in the y-coordinate of said respective pixel in which the change, dv, is derived from a difference between a previous value of the y-coordinate from a previously displayed image of said graphics primitive and a current value of the y-coordinate from a currently displayed image of said graphics primitive;
  texture circuitry for texel mapping each respective pixel of said set of pixels, said texture circuitry for receiving a coordinate (u, v) of a sample texel, for determining colors of a set of texels within said texel map determinedly located at said first and second sample distances away from said coordinate of said sample texel, for color averaging said colors with a color of said sample texel to obtain a texel component for said respective pixel for a subsequently displayed image of said graphics primitive; and
  a display screen for displaying said set of pixels with respective texel components.

16. A computer controlled graphics display system as described in claim 15 wherein said texel circuitry is also for determining coordinates of said set of texels located at sample distances away from said coordinate of sample texel and in so doing wrapping around said texel map any coordinate that exceeds maximum coordinates of said first or said second texel dimensions for said texel map in.

17. A computer controlled graphics display system as described in claim 15 wherein said texel circuitry is also for determining coordinates of said set of texels located at sample distances away from said coordinate of sample texel and in so doing pinning to an edge of said texel map any coordinate that exceeds maximum coordinates of said first or said second texel dimensions for said texel map.

18. A computer controlled graphics display system as described in claim 15 wherein said set of texels located a sample distance away from said sample texel include texels at (u, v+dv), (u, v−dv), (u+du, v) and (u−du, v) coordinates.

19. A computer controlled graphics display system as described in claim 15 wherein said set of texels located a sample distance away from said sample texel include texels at (u, v+dv), (u, v−dv), (u+du, v), (u−du, v), (u+du, v+dv), (u+du, v−dv), (u−du, v+dv) and (u−du, v−dv) coordinates.

20. A computer controlled graphics display system as described in claim 19 wherein said texel circuitry is for determining a first partial average color of the texels at coordinates (u, v), (u, v+dv), (u, v−dv), (u+du, v) and (u−du, v), for determining a second partial average color of the texels at coordinates (u+du, v+dv), (u+du, v−dv), (u−du, v+dv), (u−du, v−dv), and also for determining said texel component by performing a weighted average between said first and said second partial average colors.

21. A method for filtering texture map data in a graphics computer system, said method comprising:

accessing data for a respective pixel of a set of pixels for a graphics primitive based on a texture map wherein said respective pixel has an x-coordinate and a y-coordinate and said data includes at least a coordinate (u, v) of a sample texel corresponding to said respective pixel;

determining a first sample distance, du, along a first texel dimension, u, based on a change, dx, in the x-coordinate of said respective pixel wherein the change, dx, is derived from a difference between a previous value of the x-coordinate from a previously displayed image of said graphics primitive and a current value of the x-coordinate from a currently displayed image of said graphics primitive;

determining a second sample distance, dv, along a second texel dimension, v, based on a change, dy, in the y-coordinate of said respective pixel wherein the change, dy, is derived from a difference between a previous value of the y-coordinate from a previously displayed image of said graphics primitive and a current value of the y-coordinate from a currently displayed image of said graphics primitive;

determining colors of a set of sample texels within said texture map determinedly located at said first and second sample distances away from said coordinate of said sample texel; and deriving a texel component for said respective pixel for a subsequently displayed image of said graphics primitive by color averaging said colors with a color of said sample texel.

* * * * *